United States Patent [19]
Hazelton

[11] Patent Number: 5,431,184
[45] Date of Patent: Jul. 11, 1995

[54] STANDARD ON-OFF, OR LOCKABLE FOR SELF-LOCKING IN OFF POSITION NATURAL GAS SAFETY VALVE

[76] Inventor: Daniel H. Hazelton, 55-A Nunan St., Charleston, S.C. 29403

[21] Appl. No.: 70,071

[22] Filed: Sep. 2, 1992

Related U.S. Application Data

[63] Continuation of Ser. No. 561,565, Dec. 15, 1983, abandoned.

[51] Int. Cl.6 .............................................. F16K 35/00
[52] U.S. Cl. ..................................... 137/385; 137/383; 251/297
[58] Field of Search ................... 137/383, 385; 251/297

[56] References Cited

U.S. PATENT DOCUMENTS

| | | | |
|---|---|---|---|
| 443,885 | 12/1890 | Weil | 137/383 |
| 448,702 | 3/1891 | Wilson | 137/383 |
| 1,264,019 | 4/1918 | Craig | 137/383 |
| 1,949,926 | 3/1934 | Causey | 137/383 |
| 3,333,812 | 8/1967 | Mueller | 137/383 |
| 3,540,468 | 11/1970 | Finck, Jr. | 137/383 |

FOREIGN PATENT DOCUMENTS

509891 11/1920 France .................. 137/383

*Primary Examiner*—A. Michael Chambers

[57] ABSTRACT

This patent application describes a lockable valve locking valve, which when a suitable lock is placed on the lock structure on the outer housing of this valve, eliminates further motion of the valves inner plug once this valve has been turned to off from the on position while the lock is on the outer structure of this valve. This valve cannot be turned back on after disruption of services unless the lock has been removed. However, this valve can be turned on and back to an off position continually if so desired. By omission of the lock on the outer body this valve will give continuous pivotal operation of it inner plug through one-quarter turn arcs in a clockwise and then counter-clockwise motion. This will allow a utility company supplying natural gas a choice as to when they want a valve locking if services are disrupted or not. Included also within the attributes of this valve are its ability to allow a gas system to be quickly tested for leaks without disassembling and piping connections made into one a tap with threads. Here a test gauge can be inserted without disconnecting any piping. There is a possibility fuel can be saved because of this easy method of checking gas systems.

3 Claims, 5 Drawing Sheets

STANDARD ON-OFF, OR LOCKABLE FOR SELF-LOCKING IN OFF POSITION NATURAL GAS SAFETY VALVE

This application is a continuation of the previously filed application of Dec. 15, 1983 Ser. No. 06/561/565 now abandoned.

BACKGROUND OF THE INVENTION

1. Field of the Invention

The invention is a natural gas valve. The purpose of this valve is for controlling fluids flowing through pipelines to and from gas service meters. Valves commonly used at such service meters are quarter turn stops. These valves turn a quarter of a turn to cut off the passage lane to the flow of affluent and upon another quarter of a turn, they allow the affluent flow to resume once again. However, the suppliers of natural gas haven't any way of knowing when their supply of natural gas is being interrupted, which can result in costly fires. This especially is the case when substandard work has taken place once these gas valves are turned back on. My solution to this problem is my invention, the lockable locking valve. Its novelty is the choice it gives of allowing a gas company to know when their valve that's supplying natural gas is shut off by anyone other then their own mechanics not to be turned back on until they are notified; or, they can allow their valves to be turned off and on freely. My valve also solves another problem, safety testing of a service, and maintenance mechanics having to remove piping at gas service meters in order to perform air pressure test. Now these test can be performed by using the one-half inch opening made into the side of my valve. This opening has IPS pipe threads within and a plug screwed onto them. To test a system a person needs only to remove the plug and insert a pressure gauge. Testing then can be achieved by closing off all gas cocks within a system at the appliances and then inserting air into that system or turning just the gas back on. After testing the plug is then reinserted. In short this valve is a very good monitor for any natural gas services at the meter.

2. Description of the Related Art

Most natural gas suppliers today use what is termed a lockable valve. There operation is a very simple one and these valves are also easy to produce. What the valve does is allow a supplier of natural gas commodities to place a lock in the outer structure of their valve. This lock prohibits the further movement of the valves inner plug. This plug which has a whole passing through it, when aligned with the flow lanes of the gas valve will allow gas to pass through that particular valve. But when a lock is placed in position on the outer body of these valves, it secures the inner plug in the off position after turning off the valve, and then placing the lock on the outside of the valve. The valve is also easy to produce. The reason is because, the plug which is turned to cut the flow of gas on or off is constructed in one piece. There is a tab located on the side of these valves with a hole through it. This tab is positioned so that when the valve is turned off that hole in this tab aligns with a hole in another tab which is fastened to the body of these valves. Thus by locking the plug securely to the body of the valve this renders the plug immovable. This type of valve is used worldwide on most natural gas meter installations.

Although numerous types of an automatic locking valve have been proposed and many of them patented, most of these valves are far to complicated to manufacture and after manufacturing have a competitive selling price. Another reason most gas suppliers have not made a change from what a great many people may view as old fashioned gas valves in the present market, with so many patents having been awarded on automatic locking valves too, is the other valves do not allow a choice. These valves automatically lock when turned off usually. They cannot be set not to lock at certain times alike my invention, and locking off, at other times. I believe a major issue in serving a natural gas customer from a utility company's viewpoint is when will a valve need to be locked, where and when. The valve that works to this satisfaction in criteria I feel is a logical replacement if gas suppliers contemplated a switch in their valves. One reason is if the natural gas companies switched to automatic locking valves they may find that because there is no indication these valves locked when they are turned off, it created massive, confusion. This would be due to the fact that in colder regions some people might die if they turned off their gas for some minor repairs; because, a gas company will not be able to respond to every call to turn gas back on whatever day that call comes in. This can result in many deaths in portions of the nation and world where the climate is very cold. If utility companies switch to any locking valve they must be able to control when they wanted this valve set to lock or not.

Only a valve which works both ways is the logical candidate as replacement. For example, in winter time utility companies could leave the valves in a neutral position in colder climates so if they were turned off, they would not lock. Then in spring to fall allow the valves to lock when turned off and maybe also when there is construction work taking place. Whenever set to lock, my lockable locking valve will protect the gas company against individuals doing unauthorized work. Along with being able to be set to lock once an unauthorized interruption takes place the valve's appearance gives a definite indication that there is something different about this valve. The barrel lock on the outer body should tend to warn most people not to disrupt gas services unless and emergency. Most people will wonder how gas is coming through the valve, and it is locked. This will prompt many people to call the gas company ahead before turning off the valve. If they do interrupt services and then attempt to restore them without success they are going to say, "I saw the lock, I should have not turned off my valve on my gas system until I checked with the gas department".

Finally another pertinent consideration of any invention, is can the invention be easily repaired? This is important because over the years there are as many varied maintenance problems which will occur as there are locking valves. This is due to the various inner working parts associated with locking valves. The lock is not a part of the valve. As a result, the valve would not have to be replaced if the lock hangs up, only the lock which can be cut away. My valve also solves the problem of having to dismantle natural gas pipelines in order to test piping facilities. My gas product has a ½" ips opening in its side, with a raised plug which can be easily removed which will allow a test gauge to be placed directly into the valve. As a result, you can test the piping system when the gas valve is in the off position. Here are examples of some other types of a locking valve.

SUMMARY OF THE INVENTION

This invention is an improvement for lockable valves. If the valve is locked it will allow disruption of affluent flow; but, the lock on the valves's outer body will need to be removed before any affluent flow can continue. When a lock has not been placed on the outer body of the valve, it can be turned off and then back on by an unauthorized individual. This valve also will allow testing of gas systems without having to disconnect any piping. This feature makes it possible for spot checks of piping systems to be performed to see if there are leaks somewhere within a system.

To check a gas service for leaks one would need to turn off the gas valve then remove the plug in the valves side and insert a testing gauge. When this done if the gas cork at the cook stove(s) is turned off by instructing the customer to turn off all other gas systems inside the unit, they can turn the gas valve back on until there is a reading on the gauge. Then by turning the gas off again and waiting a few minutes minute it can determined if a fuel leak in that particular gas system, if the gauge needle falls. This lockable locking valve makes it possible now to easily detect such leaks in a whereas before, the only easy methods a meter reader's detection of leakage or a customer calling because gas scents were present. By having a customer repair these leaks, this will help conserve energy going to waste.

This valve is comprised of a core with a stem protruding from its top and the bottom. A hole is bored diagonal through the middle of this core for the passage of affluent. This core's passageway aligns in the middle of the valve with a flow lane or a passage-way made through this valve made for the passage of affluent. The shape of this core is cylindrical. On the bottom of this core is a hole which is approximately 1/16 of an inch in diameter and in this hole is a spring with a steel pin. This spring and pin are the stopping means which limit the cores movement to a quarter of a turn when this core is rotated in a clockwise motion. A motion of this rotation is typical in the operation of this lockable locking valve where the function is the turning of the device from a typical on to a typical off rotation of this valves inner plug where locking is not desired. The (spring being under-neath the) steel pin rest atop the spring within this hole and it is located directly below the gas passage lane bored diagonally through the core. This core is approximately the size of a quarter for a ¾" gas valve and extends from the top to the bottom of this valves housing. From here it tapers to a stem approximately the size of a pencil at the top and bottom of the valves housing. Toward the top and bottom of the valves core or plug are O-rings.

This valve would be cast in one-piece with a locking ear on one side and two bores perpendicular through the center, one for its plug and the other with standard ips tapered threads for its flowlanes. Atop the valves body resting on the housing is a metal bar in which a metal pin is affixed. There is a hole also to the edge, that aligns with the ear affixed to the valves housing. Through these two holes a barrel lock sets. This will cause automatic locking when this valve is turned off from the on position. This metal bar is approximately ¼" thick and 1¼" wide×3" a hole for the plugs stem. The metal pin sets directly in the center of the bar approximately ½" to the outside of the hole in which this valves stem passes. Atop this bar is the part on the stem that a wrench is placed on to turn it off, or on. Inside this top is a hollow section. The pin located in the metal bar protrudes up into this hallow section. This hollow section starts above center of the gas flow lane of the core, and hole in the bottom of the core with the spring loaded pin, when the valve is on. There is a slanted grove cast into the bottom of this valves housing. It is deepest to the center of this valve and tappers as it extends to the right as viewed with locking ear 17 and swivel bar 6 of this valve facing you. This impression starts under the center of the valves plug on this side below the valves core, about 1/16 of am inch from the outside of the valves core and extends on around to the right, in this valves housing pass the above valves passage lane and terminating below the above rear wall of this valves affluent passageway. The core will not turn further if this valve is locked and turned off because the lock attaches swivel bar 6 to locking ear 17 of which pin #12 within swivel bar 6 now is pressing firmly against grove 11 within wrenching lug 16, thus through core 19's attachment to wrenching lug 16 by means of a screw 16 thus makes further movement of the valves inner plug impossible due a to suitable lock adjoining ear 17 and swivel bar 6, through holes 2 and 18 respectively in swivel bar 6 along wrenching lug 17.

This valve can be made very economically and most valve manufactures already in the business of making natural gas valves for meters can adapt their machinery to make the gas valve I have disclosed here within. This lockable locking valve also clearly gives a user of natural gas a indication that the disclosed invention is a different type of gas valve. i.e. (how can this valve be seemingly locked in an off position, but gas services have not been affected) This can be a very valuable asset to natural gas suppliers, a lock present on the valve a customer can easily see may deter careless interruption of gas services. Before a customer tampers with their service chances are, they will call their local utility company an inquirer as to why their gas service valve is locked but their gas services have not been interrupted. Many locking valves do not allow a viewer to see such a clear difference in a valves operation as to warn against tampering. Also if the lock becomes defective that lock can very readily be removed. This lockable locking valve is capable of taking over the role of the current natural gas valves used at meters worldwide. Because this valve locks in conjunction with a suitable lock being placed on the outer structure of the valve, this valve can be used in the various ways quarter turn corks are currently employed. That is they would be able to be turned off and then back on without locking. But whenever this valve is set to lock this valve can allot a percentage of the monies spent for its cost to be returned to the pocketbook of the utility company. These fees will be returned to utility suppliers in the form of switch-ons. This gas valve allows testing for leaks in the piping via a special plug located in its side also. This also is another way utility companies will be rewarded These rewards can be realized through less lost connections at meters and less lost of fuel through leaks.

DESCRIPTION OF THE PREFERRED EMBODIMENT

Figure 1:
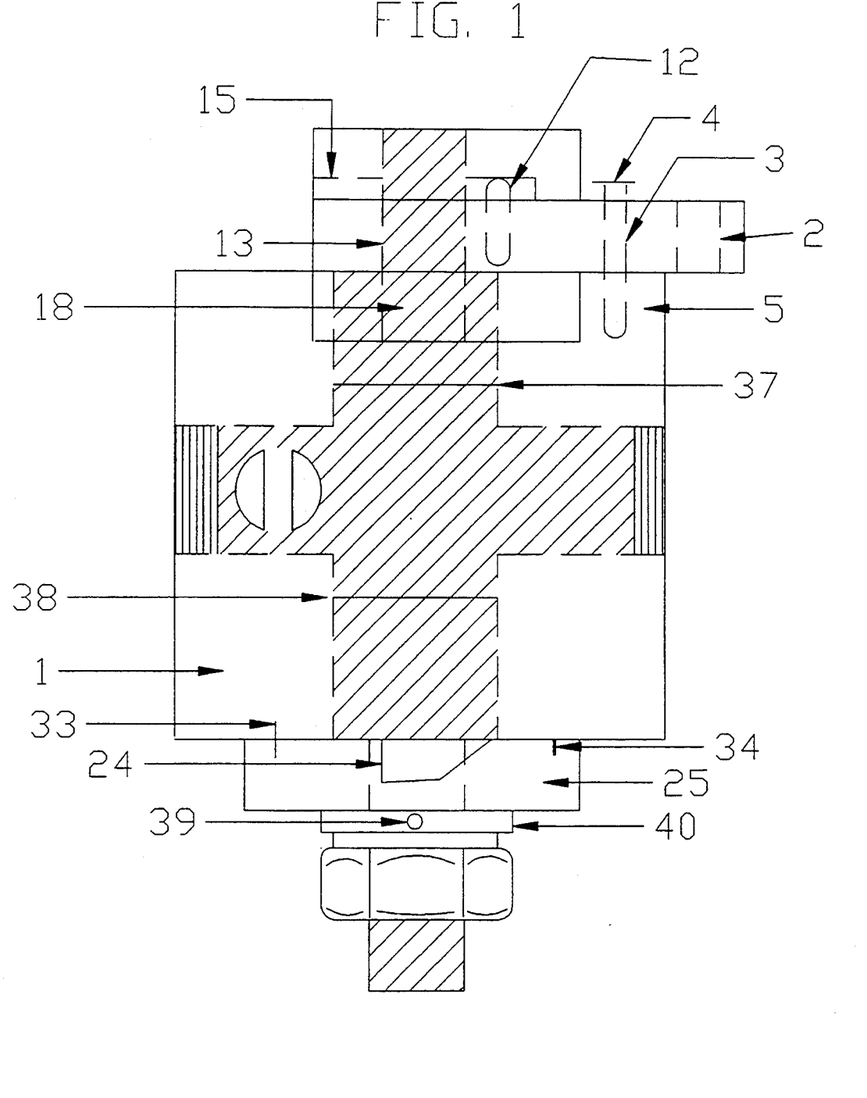
FIG. 1 is a perspective view of the valve in the standard on and off modes. An arrow is drawn from the part which pivots,indicating the direction this part turns to achieve freedom of flow through this valves passageway or not to allow freedom of affluent flow through this valves passageway.
Figure 1A:
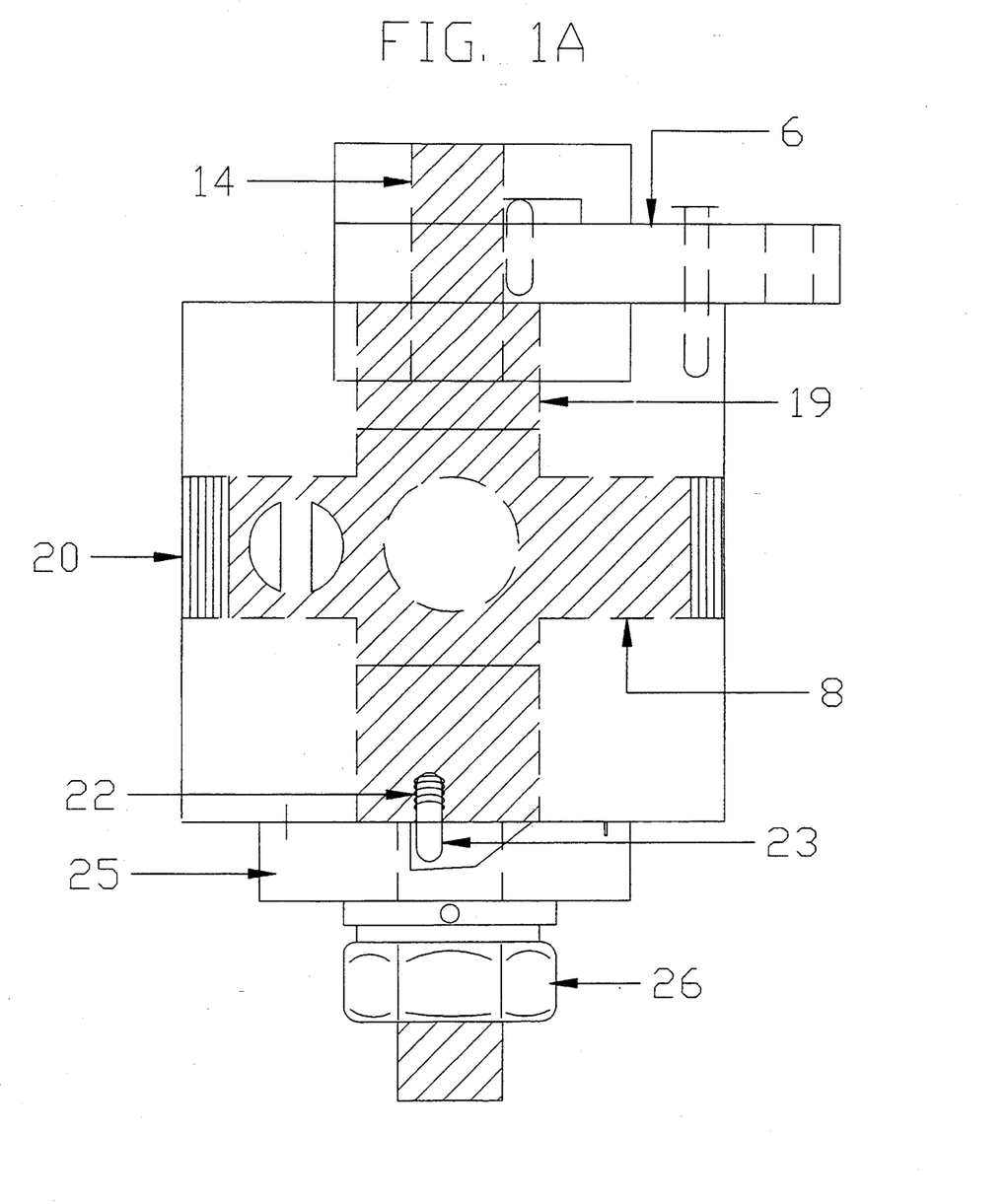
Figure 2:
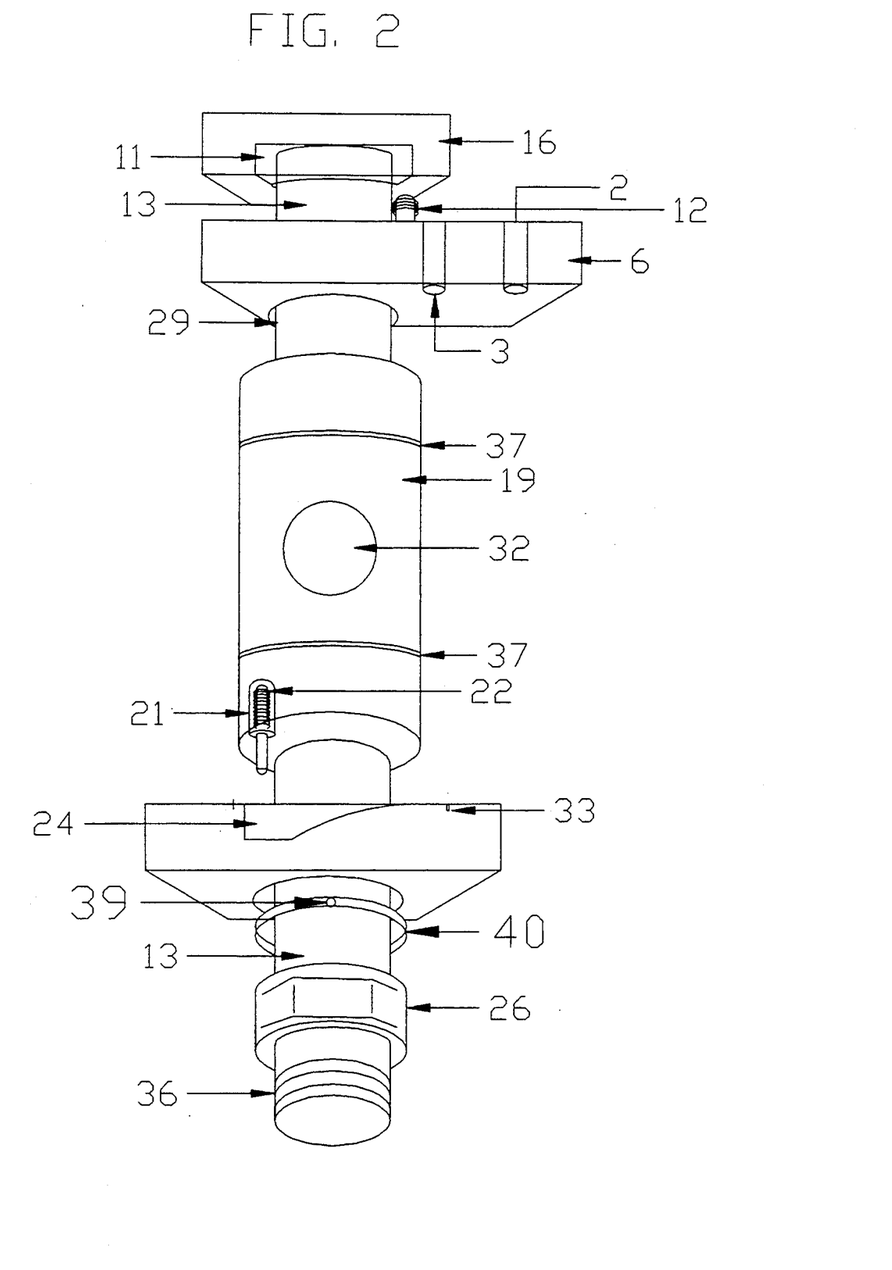
FIG. 2 is a perspective view of the valve showing the valves inner plug, along with swivel bar #6 and item #12, the pin located within swivel bar 6 along with item #25 and item 24, the slanted grove at the bottom of item 25, the bottom of this valves housing, showing their positions of relation in a normal off position. A arrow above item #16, the wrenching lug indicates the direction the lug is turned to put lug 16 in alinement with passageway 8 which allow fluids to flow through the valve.
Figure 3:
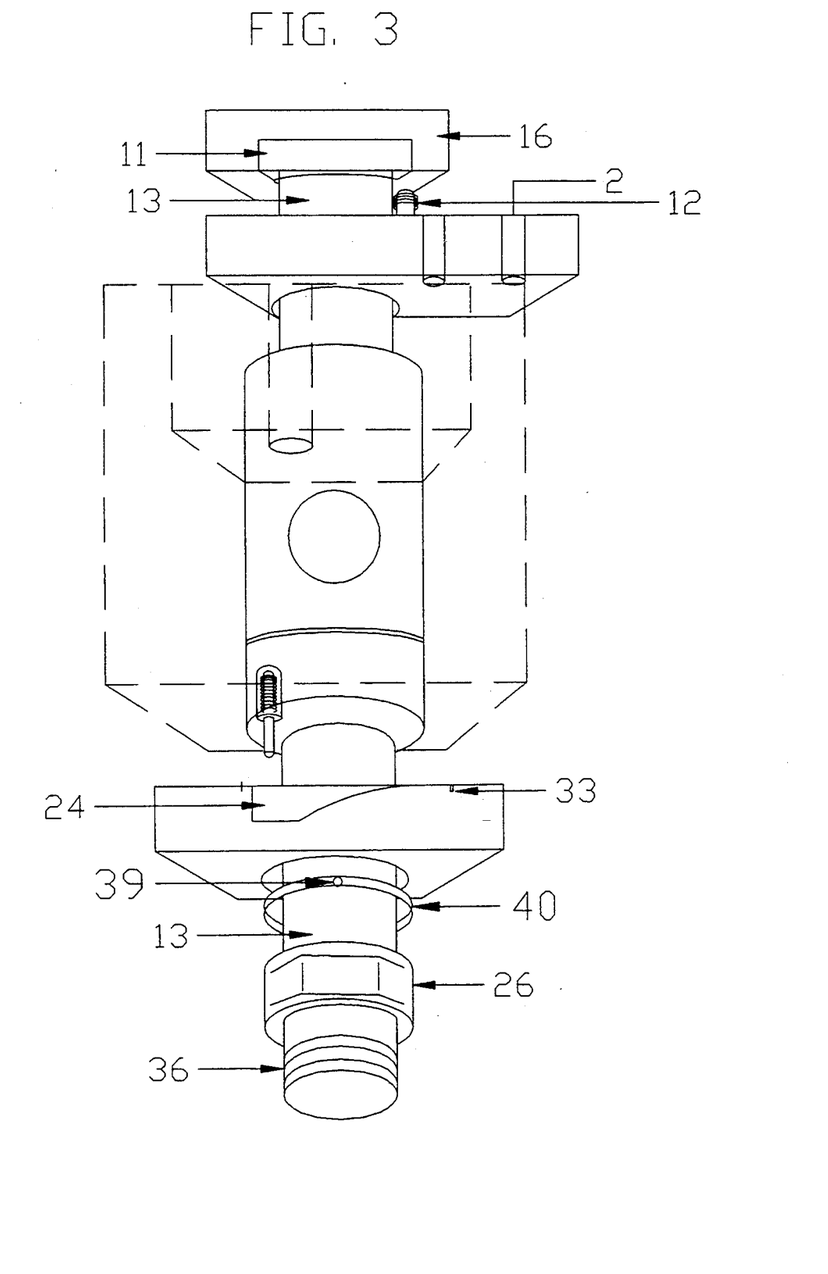
FIG. 3 is a perspective view of FIG. 2 showing a frontal view of the valves body and item 17, the ear which is attached to the outer body of this valve for securing item #6, the swivel bar to locking ear 17 of the valve by means of a suitable lock, through items numbered 2 and 18, which are the hole in swivel bar 6 and the hole in locking ear 17, respectively.

The invention as shown in FIGS. 1, 2, 3, & 4 is for an improvement of natural gas valves used for natural gas meter services. Its embodiments detail a passageway for precious commodities; such as natural gas, oil, or petroleum that is shown in FIG. 1 which extends from the core bore 19 out to the outside of this valves housing. On the last inch of item #8 which is the passageway, there are ips threads tapped there for the purpose of connecting pipes. The body of this valve, item 1 has a hole bored through its housing. This hole extends from top down to the bottom. This bore is intersected by the passageway 8 and can be tapered or straight from top to bottom, as shown in FIG. 1, and FIG. 2 & 3. This valves housing also has a tap made into its front side. This tap item 10 in FIG. 1, has a one-half inch galvanize plug screwed into it. This tap can be three-eighths of an inch in diameter for removal and testing of gas service systems if desired also.

This valves body has made into the bottom of its housing a slanted pit or grove as shown within the drawings as item #24 in item 25. This housing part of the valve is pressed on the bottom portion of the body of the valve via items 33 & 34. These items are pins and the holes which these pins communicate in the drawings. Item 33 are pins which press into holes 34 which are sightly smaller than the pins, item 33. This pit or slanted grove, item #24 in the Figures location is at the bottom of the valves housing on the same side as item #17, the valves locking ear. This pit is what limits plug 19's movement to a quarter turn as plug 19 moves clockwise bringing passageway 32 bored through the plug out of alinement with passageway 8, FIG. 1 through this valve, as the valves plug is turn from off during normal operations.

Inside this housing or valves body is inserted a core or a plug. This plug, item 19 in FIG. 2 has from one side to the other a hole bored through its center for the passage of precious fluids item 32 in FIG. 2. This hole aligns with passageway 8, shown in FIG. #1. Under plug 19 there is located a hole. This hole is one-sixteenth of an inch inward of plug 19's edge and aligns to the center of flow passage lane 32 through plug 19. This hole is approximately three-sixteenth of an inch in diameter and is labeled as item #21 in the drawing Figures. This hole has a spring inside of it, item 22 of FIGS. 2 and 3 and a pin below the spring, item #23 of FIG. 2 and 3 on the bottom of the plug. This hole 21 on the Figures houses a spring and pin slightly smaller in diameter than the diameter of hole 21 in FIG. 2. Hole 21 houses spring 22 and steel pin 23 which interacts with slanted grove 24 below plug 19 along with pin 12 which protrudes from the top of swivel 6, that aligns with flow passage way 8 or on right side facing locking ear 17, during normal operation of the valve and limits clockwise movement of plug 19 during normal interruption of affluent flow. See FIGS. 2 and 3. Attached to the top, and the bottom of plug 19 integrally is a stem. It is equal distance in length above and below plus 19. This is labeled 13. See FIG. 2. At the bottom of the valve where the stem of shaft 13 extends through valve 1's housing attachment 25 there are threads 36. Consult FIG. #3. These are here for nut 26 and washer 38 to be screwed onto stem 13 to secure plug 19 through housings attachment 25 with valve body 1 and to aline grove 11 in wrenching lug 16 atop valve body 1 with swivel bar 6's pin 12. This is how valves plug 19 is anchored. At the top of the plug, there is a hole with threads on the inside #35 of FIG. 2. This allows plug 19 to be fastened to the top most part or wrenching lug 16 by way of screw 15 and from here plug 19 is turned to cut the valve on, or off. See FIG. 2. This plug when it is inserted into the valves housing will be inserted with flow lane 32 and swivel bar 6 aligned with the valves passageway swivel bar 6 will also be perpendicular to ear 17 on the right facing ear 17. Wrenching lug 16 is thus then attached to stem 13 by screw 15 with pin 12 extending into grove 11.

Figure 4:
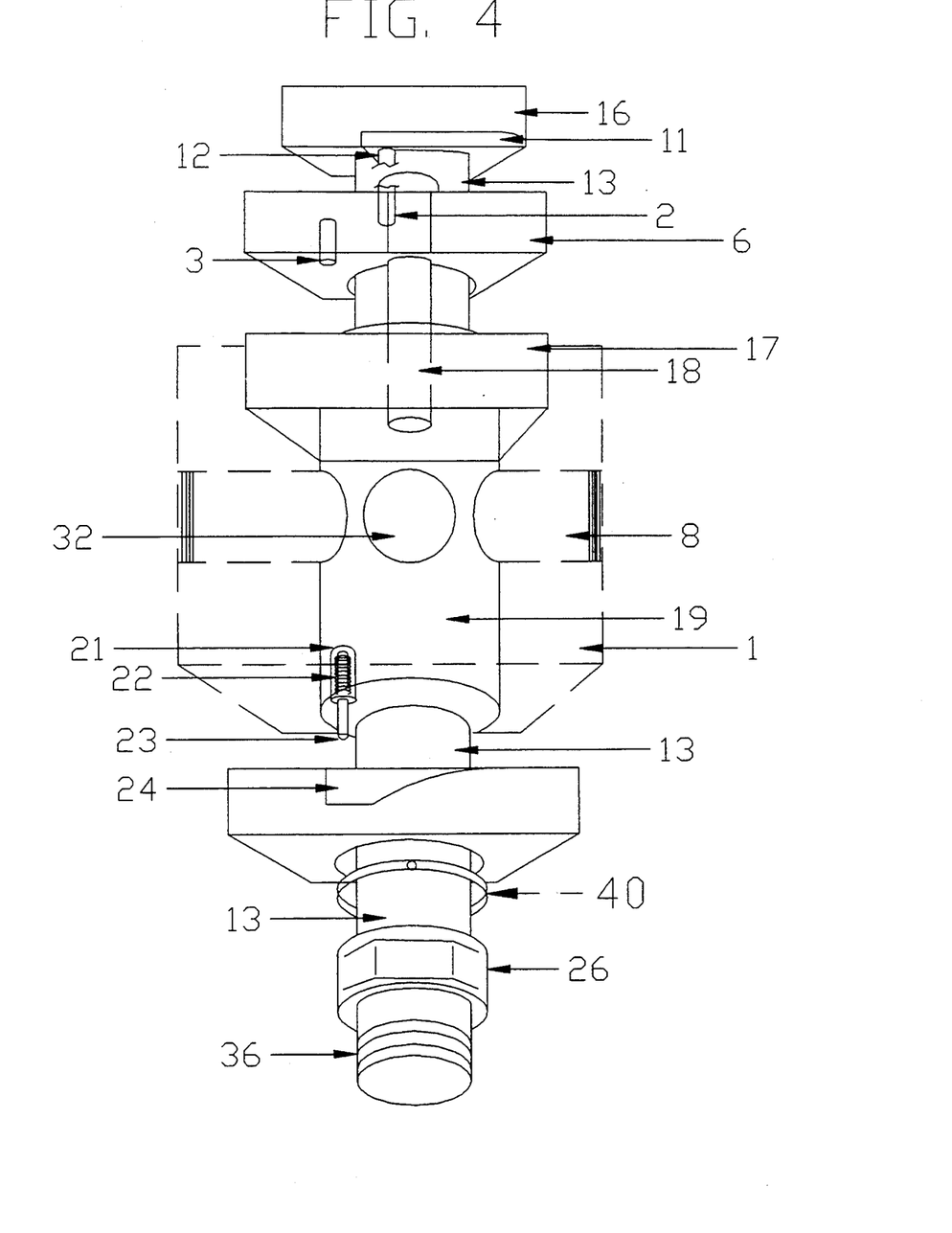
FIG. 4 is basically a perspective view of FIG. #3 which shows swivel bar 6 aligned with locking ear 17 and the valves plug in the position it will be after having been turned off when locked.

Stem 13 which extends from the top and from the bottom of plug 19 is cast from one-piece of brass. With in plug 19 there are cut two groves, one above flowlane 32 and one below it. These groves are labeled as item 37 in FIG. 2. Within groves 37 are placed rubber o-rings item 38 in FIG. #2. These o-ring are here to form a seal with body 1 of the of this valve. See FIG. 1. Directly atop plug 19 is the swiveling bar labeled as item #6. Item 6 has three holes, item #2 and item #3 and item 29 made through swivel bar 6. Hole 2 is made approximately one-quarter of an inch inward from one end of swivel bar 6 and made in line with center line of the swivel bar. On the other end of swivel bar 6 away from hole 2 is another hole made through swivel bar 6. This hole is approximately three-eighths to one-half inch in diameter and is made through the swivel bar for stem 13 of plug 19's passage toward the top most part of this valve, item. 16 the wrenching lug. This hole too is in center line of the swivel bar and is labeled as item 29.See FIGS. 2 and 3. Last is hole 3. Here pin 4, FIG. 1 attaches swivel bar 6 to valves body 1. Hole 3 is approximately one-quarter of an inch inward of hole 2 and is approximately one-sixteenth of am inch in diameter. Through hole 29 stem 13 of item 19 the plug travels and terminates within item 16, the wrenching lug. As seen in FIG. #2 item #6 has a pin protruding from the top of it. This pin goes into the wrenching lug, where in there, is a grove. This acts as a stop for wrenching lug 16, when it is turned to activate plug 19 when normal activation valve of plug 19 is taking place. When normal operation of plug 19 is not taking place plug 19 further movement from an open position to a closed position is terminated once a suitable lock has been inserted through locking ear 17 and swivel bar 6. FIG. 4, demonstrates the alinement of plug 19, swivel bar 6, locking ear 17, and slanted grove 24 below plug 19 within valve body 1 when a suitable lock adjoins locking ear 17 and swivel bar 6, disallows all further movement of plug 19 within valve 1's housing. Whenever this valve is locked with a suitable lock interruption of affluent flow can be achieved however, to resume affluent flow the suitable lock must be removed before plug 19's activation can be achieved. When normal or continual on to off operation is no longer desired a suitable lock can then be placed through locking ear 17 and swivel bar 6 to terminate further movement of plug 19 when affluent are passing through plug 19's passageway, bore 32. This will activate termination of further counter-clockwise or clockwise movement within the plug, 19. Activating locking from normal operation of valve body 1 is initiated through the following steps:

a) pin 4 through swivel bar 6 is removed, b) swivel bar 6 is turned counter-clockwise until bore 2 within swivel bar 6 aligns with bore 18 within locking ear 17, c) place a suitable lock through bore 2 within swivel bar 6 and bore 18 within locking ear 17, now the valve is ready for d) turning wrenching lug 16 counter-clockwise one-quarter turn to interrupt the flow of affluent passing through valve body 1.

Plug 19 can no longer then be moved because pin 12 located within swivel bar 6 hitting grove 13's wall and swivel bar 6 is secured to locking ear 17 through bore 18 within locking ear 17 and bore 2 within swivel bar 6, thus allowing plug 19 movement only when swivel bar 6 is allowed further rotation. Movement of plug 19 is actuated through movement of wrenching lug 16 because stem 13 passes through a hole in swivel bar 6 and is attached by screw 15 at wrench lug 16 and is connected to plug 19 by stem 13. Wrench lug 16 will turn in the counter-clockwise direction until pin 12 of swivel bar 6 meets the back of grove 11 in wrench lug 16. At this point plug 19 will have turned 90° and would not be able to go any farther because swivel bar 6 which is locked to the valves housing by way of arm 17 on the valves body keeps swivel bar 6 in place. The pin 23, which is located directly below the center of the plugs passageway 32 is aligned with the center of the housing passageway 8 and the grove, in the wrenching lug is also aligned with the center of the valves passageway 8, where it starts, and makes a ace around directly to the front center of the valve, then stops. Having turned the wrenching lug 16 counter-clockwise, it brought plug 19 one-quarter of a turn, thus positioning flow lane 32 perpendicular with the passageway through the valves housing.

Also plug 19 now is not aligned with the gas passageway that passes through the housing, it is at a right angle to the hole through the passageway, thus stopping the flow of gas, as pictured in FIG. 4 In FIG. 4 this valve's filaments are diagramed in alinement as they will coexist when this valve has a suitable lock within bore 18 of locking ear 17 and bore 2 of swivel bar 6 and plug 19 has been rotated from an on position to a close position. As diagramed within FIG. 4, item #23 which is the pin located within the underside of plug 19 is located within slanted grove 24. Housing 25 containing slanted grove 24 which is connected to body 1, the main housing of this valve is casted in one piece with slanted grove 24 and pins 33 which aline with hole 34 casted in one piece within the framework of body 1 which are one-thirty-second of an inch smaller in diameter in size than pins 33 in the housing of the bottom of the valve which housing part function is to limit plug 19's rotation once a quarter of a turn has been achieved through rotation of wrenching lug 16 has resumed its position, allowing plug 19 to resume all normal functions of continuous operation once any suitable lock contained within bore 18 within locking ear 17 and bore 2 within swivel bar 6 have been removed. Once any suitable lock has been removed continuous plug rotation from a closed position back to an open position is achievable. Housing attachment 25 containing slanted grove which is pressed on to the valves body 1 contains bore 31 a hole that aligns with stem 13 of plug 19 and allows a nut and washer to be screwed upon the lower section of the portion at the lower section of plug 19's portion of stem 13 which keeps plug 19 and stem 13 assembly securely in place within body 1 of this valve. In item 40, the washer under assembly part 25 there is also a hole with a pin, 37. This hole is bored into washer 40 for pin 37 which terminates about midway within stem 13. Once pin 37 which has zero clearance within bore 39 of washer 40 is pressed through into place plug 19 within this valve if nut 26, FIG. 2 holding the lower exposed portion of stem 13 visible below housing attachment 25 of the Figures is removed pin 37 within washer 40 will not allow plug 19 to be pushed upward out body 1's housing. To disengage plug 19 once arrested through common means of a suitable lock through locking ear 17's bore 18 casted in one-piece. construction with body 1 to bore 2 within swivel bar 6 containing pin 12 which extends upward from swivel bar 6 into grove 11 of wrenching lug 16 whereby interlocking attachment to plug 19 is achieved by screw 15 traveling through bore 16 and terminating within tap 35 of stem 13's protrusion through bore 29 of swivel bar 6 wherein pin 12 upon the arrest of plug 19 becomes jammed against the wall of grove 11 creating an impasse for plug 19, you must possess a key or combination for the suitable lock to unlock that lock and remove it from the outer structure of valve body 1. Therefore this means of deterring a gas pipeline function that is not authorized is very economical to use, do to the fact that this valve has very few working parts. When the utilities company or a authorized person in charge of a key wants to restore services, they remove what type of lock is on the outer structure, and rotate 6, which is the swivel bar on top of the housing in FIG. 2 and below 16, the wrenching lug one-quarter turn clockwise and secure swivel bar 6 through bore 3 to tap 5 through screw 4 allows normal operation of plug 19 to resume; otherwise a rotation of 360 degrees in the counter-clockwise direction positions swivel bar 6 once again in position over locking ear 17 so any suitable lock upon its communication through bore 18 and bore 2, plug 19 will become arrested again upon a one-quarter counter-clockwise turn of wrenching lug 16 whereas plug 19's affluent passageway 32 is pivoted perpendicular to flow passage lane 8 containing standard IPS tapering threads 20 beginning on both sides of valve body 1's flow passage lane 8.

The valve described is suited as a replacement type of gas valve for utility companies. The locking ear 17 and the swivel bar 6 should be composed of a hacksaw resistant material as well as any suitable lock. This will help deter individuals intent on sawing through these parts. Plug 19 and stem 13 should be composed of brass. A nerophream rubber is recommended for gaskets 37 contained by shallow grove 38; however, any suitable form of rubber will be adequate. Body 1 and attachment are composed of black iron or steel; however, brass maybe substituted for screws. Locks may become dysfunctional due to exposure to weather. Having a locking valve with its source for locking on the outer structure can be advantageous where economics are concerned. One such advantage should be through the distinct warning of a lock present on the outer structure. Another advantage is through fees for down time of the system lock. This is the time sold by a utility company to a contractor for locking valves freedom of locking so repairs or alterations can be performed. Alternate uses of this valve include water, steam and oil systems.

What is claimed:

1. A valve comprising a body having a plurality of aligned ports for the passage of fluids, a plug having a valve stem and disposed within said body, rotatable in a first direction by a wrench lug attached to said valve stem to an open position and rotatable a quarter turn in a second direction to a closed position, said wrench lug including a radially disposed 90 degree groove, a swivel bar rotatable on said valve stem and disposed between said wrench lug and a top portion of said valve body, said swivel bar including a pin disposed in said groove, said swivel bar rotatable between a first position to allow opening and closing of the valve and a second position in which said pin abuts an end portion of said wrench lug groove and prevents rotation of said valve to said first open position, means interconnecting said swivel bar and said top portion of said valve body when said swivel bar is in said second position to prevent rotation of said valve to said open position.

2. A valve according to claim 1 wherein said valve body includes removable plug means for an additional port for insertion of a test gauge means to allow inspection of said valve installation.

3. A valve according to claim 1 wherein said means interconnecting said swivel bar and said top portion of said body is a lock means.

* * * * *